(12) United States Patent
Siegel

(10) Patent No.: US 7,498,065 B2
(45) Date of Patent: *Mar. 3, 2009

(54) UV PRINTING AND CURING OF CDS, DVDS, GOLF BALLS AND OTHER PRODUCTS

(75) Inventor: Stephen B. Siegel, Chicago, IL (US)

(73) Assignee: Con-Trol-Cure, Inc., Chicago, IL (US)

( * ) Notice: Subject to any disclaimer, the term of this patent is extended or adjusted under 35 U.S.C. 154(b) by 52 days.

This patent is subject to a terminal disclaimer.

(21) Appl. No.: 10/907,180

(22) Filed: Mar. 23, 2005

(65) Prior Publication Data

US 2005/0154075 A1 Jul. 14, 2005

Related U.S. Application Data

(63) Continuation-in-part of application No. 10/886,332, filed on Jul. 7, 2004, and a continuation-in-part of application No. 10/753,947, filed on Jan. 7, 2004, and a continuation-in-part of application No. 10/386,980, filed on Mar. 12, 2003, and a continuation-in-part of application No. 10/339,264, filed on Jan. 9, 2003, now Pat. No. 7,175,712.

(51) Int. Cl.
C08F 2/46 (2006.01)

(52) U.S. Cl. ........................ 427/558; 427/557; 427/553; 427/487; 427/457; 427/508; 427/525; 522/913; 250/491.1; 250/492.1; 250/505.1

(58) Field of Classification Search ............. 250/504 R, 250/504 H, 494.1, 552, 553, 491.1, 492.1, 250/505.1; 522/148, 149, 150, 151, 152, 522/153, 154–157, 158–169, 913; 427/458, 427/487, 492, 588, 558, 457, 557, 553, 508, 427/525

See application file for complete search history.

(56) References Cited

U.S. PATENT DOCUMENTS

| | | | |
|---|---|---|---|
| 3,737,051 A | 6/1973 | Horino | |
| 3,800,160 A | 3/1974 | Ishizawa et al. | |
| 3,819,929 A | 6/1974 | Newman | |
| 4,010,374 A | 3/1977 | Ramler | |
| 4,033,263 A | 7/1977 | Richmond | |
| 4,145,136 A | 3/1979 | Takahashi | |
| 4,309,452 A | 1/1982 | Sachs | 427/44 |
| 4,490,410 A | 12/1984 | Takiyama et al. | |
| 4,910,107 A | 3/1990 | Kawada et al. | |
| 4,980,701 A | 12/1990 | Contois et al. | 346/107 |
| 4,990,971 A | 2/1991 | Le Creff | |
| 5,062,723 A | 11/1991 | Takeda et al. | |
| 5,278,432 A | 1/1994 | Ignatius et al. | |
| 5,278,482 A | 1/1994 | Bahn | |
| 5,420,768 A | 5/1995 | Kennedy | |
| 5,535,673 A | 7/1996 | Bocko et al. | 101/211 |
| 5,634,711 A | 6/1997 | Kennedy et al. | |
| 5,660,461 A | 8/1997 | Ignatius et al. | 362/24 |
| 5,731,112 A | 3/1998 | Lewis et al. | |
| 5,762,867 A | 6/1998 | D'Silva | |
| 5,764,263 A | 6/1998 | Lin | |
| 5,840,451 A | 11/1998 | Moore et al. | |
| D404,045 S | 1/1999 | Mandellos | |
| D404,046 S | 1/1999 | Mandellos | |
| D404,409 S | 1/1999 | Mandellos | |
| 5,857,767 A | 1/1999 | Hochstein | 362/294 |
| 5,963,240 A | 10/1999 | Shinohara et al. | |
| 5,973,331 A | 10/1999 | Stevens et al. | |
| 5,986,682 A | 11/1999 | Itou | |
| 5,990,498 A | 11/1999 | Chapnik et al. | |
| 6,013,330 A | 1/2000 | Lutz | |
| 6,075,595 A | 6/2000 | Malinen | |
| 6,092,890 A | 7/2000 | Wen et al. | 347/101 |
| 6,112,037 A | 8/2000 | Nagata et al. | |
| 6,145,979 A | 11/2000 | Caiger et al. | |
| 6,163,036 A | 12/2000 | Taninaka et al. | 257/88 |
| 6,185,394 B1 | 2/2001 | Lee | |
| 6,188,086 B1 | 2/2001 | Masuda et al. | |
| 6,200,134 B1 | 3/2001 | Kovac et al. | |
| 6,354,700 B1 | 3/2002 | Roth | |
| 6,425,663 B1 | 7/2002 | Eastlund et al. | |
| 6,447,112 B1 | 9/2002 | Hu et al. | |

(Continued)

FOREIGN PATENT DOCUMENTS

GB 9912437.2 5/1999

(Continued)

OTHER PUBLICATIONS

Publication: "*Photoinitiators for UV Curing Key Products Selection Guide, Coating Effects*", by Ciba Specialty Chemicals, Edition 2001, Switzerland.

Publication: "*Photoinitiators for UV Curing Formulators' Guide for Coatings, Additives*", by Ciba Specialty Chemicals, Edition 2001, Switzerland.

Publication: "*Optical Properties of Si-Doped $Al_xGa_{1-x}N/Al_yGa_{1-y}N$ (x=0.24-0.53, y=0.11) Multi-Quantum-Well Structures*" by H. Hirayama and Y. Aoyagi, The Institute of Physical and Chemical Research, Saitama, Japan, MRS Internet J. Nitride Semicond. Res. 4S1,G3.74 (1999).

Webster's Ninth New Collegiate Dictionary, Merriam-Webster INC., Springfiled, Mass., USA, 1990 (no month), excerpt p. 199 & 394.

PCT International Search Report and Written Opinion of International Searching Authority, mailed Oct. 13, 2004 for International Application No. PCT/US04/01495, International Filing Date Jan. 21, 2004 for Applicant, Con-Trol-Cure, Inc.

(Continued)

Primary Examiner—Sanza L. McCledon
(74) Attorney, Agent, or Firm—Neal Gerber & Eisenberg LLP

(57) ABSTRACT

A special method is provided for more uniformly and quickly curing products with a scratch-resistant UV curable coating or UV curable printing thereon, such as for CDs, DVDs, golf balls, golf tees, eye glass lenses, contact lenses, string instruments, decorative labels, peelable labels, peelable stamps, doors, countertops, etc. The method can also be operated with one or more special UV curing apparatus equipped with a controller, temperature sensors, and heat dissipators.

24 Claims, 15 Drawing Sheets

U.S. PATENT DOCUMENTS

| | | | |
|---|---|---|---|
| 6,457,823 B1 | 10/2002 | Cleary et al. | |
| 6,498,355 B1 | 12/2002 | Harrah et al. | 257/99 |
| 6,501,084 B1 | 12/2002 | Sakai et al. | |
| 6,517,218 B2 | 2/2003 | Hochstein | |
| 6,523,948 B2 | 2/2003 | Matsumoto et al. | |
| 6,525,752 B2 | 2/2003 | Vackier et al. | |
| 6,528,955 B1 | 3/2003 | Powers et al. | |
| 6,536,889 B1 | 3/2003 | Biegelsen et al. | 347/95 |
| 6,561,640 B1 | 5/2003 | Young | 347/102 |
| 6,589,716 B2 | 7/2003 | Sweatt et al. | |
| 6,613,170 B1 | 9/2003 | Ohno | |
| 6,630,286 B2 | 10/2003 | Kramer | |
| 6,671,421 B1 | 12/2003 | Ogata et al. | |
| 6,683,421 B1 | 1/2004 | Kennedy et al. | 315/291 |
| 6,726,317 B2 | 4/2004 | Codos | |
| 6,755,647 B2 | 6/2004 | Melikechi et al. | |
| 6,783,810 B2 | 8/2004 | Jin et al. | |
| 6,807,906 B1 | 10/2004 | DeMoore et al. | |
| 6,880,954 B2 | 4/2005 | Ollett et al. | |
| 6,885,035 B2 | 4/2005 | Bhat et al. | |
| 6,949,591 B1 | 9/2005 | Allard et al. | |
| 7,080,900 B2 | 7/2006 | Takabayashi et al. | |
| 7,137,696 B2 | 11/2006 | Siegel | |
| 7,153,015 B2 | 12/2006 | Brukilacchio | |
| 7,175,712 B2 | 2/2007 | Siegel | |
| 2001/0030866 A1 | 10/2001 | Hochestein | |
| 2001/0032985 A1 | 10/2001 | Bhat et al. | 257/86 |
| 2001/0046652 A1 | 11/2001 | Ostler et al. | 433/29 |
| 2001/0048814 A1 | 12/2001 | Lenmann et al. | 396/154 |
| 2001/0052920 A1 | 12/2001 | Matsumoto et al. | |
| 2002/0015234 A1 | 2/2002 | Suzuki et al. | |
| 2002/0016378 A1 | 2/2002 | Jin et al. | 522/1 |
| 2002/0044188 A1 | 4/2002 | Codos | 347/106 |
| 2002/0074554 A1 | 6/2002 | Sweatt et al. | |
| 2002/0074559 A1 | 6/2002 | Dowling et al. | 257/99 |
| 2002/0149660 A1 | 10/2002 | Cleary et al. | |
| 2002/0172913 A1 | 11/2002 | Densen | |
| 2002/0175299 A1 | 11/2002 | Kanie et al. | |
| 2003/0035037 A1 | 2/2003 | Mills et al. | |
| 2003/0109599 A1 | 6/2003 | Kamen | |
| 2003/0218880 A1 | 11/2003 | Brukilacchio | |
| 2003/0222961 A1 | 12/2003 | Atsushi | |
| 2004/0011457 A1 | 1/2004 | Kobayashi et al. | 156/272.2 |
| 2004/0090794 A1 | 5/2004 | Ollett et al. | 362/555 |
| 2004/0114016 A1 | 6/2004 | Yokoyama | |
| 2004/0134603 A1 | 7/2004 | Kobayashi et al. | 156/272.8 |
| 2004/0135159 A1 | 7/2004 | Siegel | |
| 2004/0152038 A1 | 8/2004 | Kumagai | |
| 2004/0156130 A1 | 8/2004 | Powell et al. | |
| 2004/0164325 A1 | 8/2004 | Siegel | |
| 2004/0166249 A1 | 8/2004 | Siegel | |
| 2004/0189773 A1 | 9/2004 | Masumi | |
| 2004/0238111 A1 | 12/2004 | Siegel | |
| 2005/0099478 A1 | 5/2005 | Iwase | |
| 2005/0104946 A1 | 5/2005 | Siegel | |
| 2005/0152146 A1 | 7/2005 | Owen et al. | |
| 2005/0222295 A1 | 10/2005 | Siegel | |
| 2006/0007290 A1 | 1/2006 | Oshima et al. | |
| 2006/0127594 A1 | 6/2006 | Siegel | |
| 2006/0192829 A1 | 8/2006 | Mills et al. | |
| 2006/0204670 A1 | 9/2006 | Siegel | |
| 2006/0230969 A1 | 10/2006 | Vosahlo | |
| 2006/0233501 A1 | 10/2006 | Sampson | |
| 2006/0237658 A1 | 10/2006 | Waluszko | |
| 2006/0245187 A1 | 11/2006 | Scott et al. | |

FOREIGN PATENT DOCUMENTS

| | | |
|---|---|---|
| GB | 2350321 A | 11/2000 |
| GB | 0215168.6 | 7/2002 |
| GB | 0229825.5 | 12/2002 |
| GB | 2390332 A | 1/2004 |
| GB | 2396331 A | 6/2004 |
| JP | 60-126830 | 7/1985 |
| JP | 62-026876 | 2/1987 |
| JP | 1-124324 | 5/1989 |
| JP | 5-323462 | 12/1993 |
| JP | 11-277795 | 10/1999 |
| JP | 2000-268416 B | 9/2000 |
| JP | 2001-209980 B | 3/2001 |
| JP | 2002-248803 | 9/2002 |
| JP | 2005-129662 B | 5/2005 |
| WO | WO 2001/011426 A | 2/2001 |
| WO | WO 2002/093265 A | 11/2002 |
| WO | PCT/GB03/02834 | 7/2003 |
| WO | PCT/US03/023504 | 7/2003 |
| WO | WO 2003/096387 A | 11/2003 |
| WO | WO 2004/002746 A1 | 1/2004 |
| WO | WO 2004/011848 A2 | 2/2004 |
| WO | WO 2004/081475 A | 9/2004 |

OTHER PUBLICATIONS

"Pappas, Peter, ed., UV Curing: Science And Technology,""Light Sources""(by Vincent McGinniss), technology marketing Corp., stand forward, Connecticut, USA, 1978 (no month), excerpts p. 96-101.".

PCT International Search Report, mailed on Oct. 14, 2005 for International Application No. PCT/US04/01594, International Filing Date Jan. 23, 2004 for Applicant, Con-Trol-Cure, Inc.

PCT International Search Report, mailed on Apr. 20, 2005 for International Application No. PCT/US04/38069, International Filing Date Nov. 16, 2004 for Applicant, Con-Trol-Cure, Inc.

PCT International Search Report, mailed on Feb. 11, 2005 for International Application No. PCT/US04/21655, International Filing Date Jul. 7, 2004 for Applicant, Con-Trol-Cure, Inc.

PCT International Search Report and Written Opinion of International Searching Authority, mailed on Feb. 11, 2005 for International Application No. PCT/US04/20935, International Filing Date Jun. 29, 2004 for Applicant, Con-Trol-Cure, Inc.

PCT International Search Report, mailed on Apr. 20, 2005 for International Application No. PCT/US04/38068, International Filing Date Nov. 16, 2004 for Applicant, Con-Trol-Cure, Inc.

PCT International Search Report, mailed on Sep. 14, 2006 for International Application No. PCT/US05/34726, International Filing Date Sep. 27, 2005 for Applicant, Con-Trol-Cure, Inc.

PCT International Search Report, mailed on Apr. 6, 2006 for International Application No. PCT/US05/33619. International Filing Date Sep. 20, 2005 for Applicant, Con-Trol-Cure, Inc.

PCT International Search Report, mailed on Jun. 28, 2007 for International Application No. PCT/US07/06116, International Filing Date Jan. 26, 2007 for Applicant, Con-Trol-Cure, Inc.

Written Option dated Sep. 10, 2007 for related Singapore Patent Application No. 200604514.

Office Action dated Feb. 1, 2008 for Chinese Patent Application 2004800400114.3.

Korean Office Action dated Sep. 10, 2007 for related Koreab Patent Application No. 10-2006-7015718.

Korean Office Action dated Mar. 17, 2008 for related Korean Patent Application No. 10-2006-7015718.

Supplementary European Search Report dated Jul. 11, 2008 for Application No. EP 04 80 1055.

Australian Office Written Opinion dated Jun. 20, 2008 for Application No. SG 200604512-4.

Supplementary European Search Report dated Jul. 14, 2008 for Application No. EP 04 82 1128.

Supplementary European Search Report dated Jul. 15, 2008 for Application No. EP 04 77 7269.

Notice of Allowance dated Aug. 8, 2008 for U.S. Application No. 10/886,332.

Supplementary European Search Report dated Jul. 8, 2008 for Application No. EP 04 80 1056.

Office Action dated Aug. 19, 2008 for U.S. Appl. No. 11/561,843.

International Preliminary Report on Patentability for Application No. PCT/US2007/061116.

European Search Report dated Aug. 1, 2008 for Application No. EP 04 70 4792.

UV PRINTING AND CURING OF CDS, DVDS, GOLF BALLS AND OTHER PRODUCTS

CROSS REFERENCE TO RELATED APPLICATIONS

This application is a continuation-in-part of U.S. application Ser. No. 10/886,332, filed Jul. 7, 2004 for UV LED Control Loop and Controller for UV Curing, which is a continuation-in-part of U.S. application Ser. No. 10/753,947, filed Jan. 7, 2004, for a "UV Curing Method and Apparatus" which is a continuation-in-part of U.S. application Ser. No 10/386,980 filed Mar. 12, 2003, for "Multiple Wavelength UV Curing" which is a continuation-in-part of U.S. application Ser. No. 10/339,264 filed Jan. 9, 2003, for "A Light Emitting Apparatus and Method for Curing Inks, Coatings and Adhesives".

BACKGROUND OF THE INVENTION

1. Field of the Invention

The present invention relates to a method for ultraviolet (UV) curing of inks, coatings and adhesives having UV photo initiators therein which, when exposed to UV light, convert monomers in the inks, coatings and adhesives to linking polymers to solidify the monomer material and which are placed on a variety of products. More specifically, the present invention relates to a method for UV curing of inks, coatings or adhesives on compact disks (discs) (CDs), digital video disks (discs) (DVDs), golf balls, golf tees, string instruments, eye glass lenses, contact lenses, labels and other products.

2. Description of the Related Art

Heretofore, UV light-emitting diodes (LEDs) and UV lamps have been proposed for supplying UV light for curing UV curable inks, coatings and adhesives on various products. Many of the prior art techniques are time-consuming and inefficient and can cause uneven curing of the products.

It is, therefore, desirable to provide an improved UV curing method and apparatus which overcomes most, if not all, of the preceding problems.

BRIEF SUMMARY OF THE INVENTION

An improved UV curing method and apparatus are provided which quickly, efficiently and effectively cures UV curable products, articles, inks, coatings, adhesives, and other objects. Advantageously, the user-friendly UV curing method and apparatus are economical, dependable and easy-to-use.

In the novel method, substantially uniform intermittent blasts or pulses of UV light are emitted from UV light emitters in one or more UV curing apparatus at a substantially constant output level and intensity along one or more UV light paths. The UV light emitters can be staggered rows of UV light emitting diodes (LEDs), UV light-emitting diode (LED) chips, organic LEDs, and/or polymer LEDs. The UV curable products, articles, inks, coatings, adhesives, and other objects can be intermittently, sequentially or continuously positioned in the UV light path. Desirably, the UV light is substantially uniformly applied and distributed on the UV curable products, articles, inks, coatings, adhesives, and other products in the UV light path. Advantageously, thereafter, the UV curable products, articles, inks, coatings, adhesives, and other objects are partially or fully substantially uniformly and evenly polymerized, set and cured in the UV-light path with the intermittent blasts or pulses of UV light.

In the preferred method, the temperature of the UV light emitters, UV curing apparatus, or UV light is frequently or continuously sensed and monitored, such as with heat (temperature) sensors. The intensity of the UV light can be effectively controlled, such as with a controller, by adjusting the current and/or power in the UV light emitters in response to the sensed temperature to attain a uniform light output level and intensity. Heat emitted from the UV light emitters and UV curing apparatus can be dissipated and cooled with one or more heat sinks, fins, heat pumps, and/or a motor-operated fans.

The UV curable products, articles, inks, coatings, adhesives, and other objects can be conveyed by a conveyor in the light path. The UV curable products, articles, inks, coatings, adhesives, and other objects can also be spun or rotated in the light path to enhance uniform distribution and application of UV light and curing on the UV curable products, articles, inks, coatings, adhesives, and other objects. In some circumstances, such as for some types of UV printing, it may be desirable to position, stop, or maintain the UV curable products, articles, inks, coatings, adhesives, and other objects in a stationary fixed location and position on the UV light path during curing.

The novel UV curing method is particularly useful to cure clear transparent scratch-resistant UV curable coatings and/or printing of names, trademarks, logos, and/or designs of black or colored UV curable ink on various products, such as: compact discs (CDs) including audio discs and computer discs, digital video discs (DVDs), golf balls, golf tees, eye glass lenses, UV curable soft hydroscopic contact lenses, doors, counter tops, guitars and other string instruments, decorative labels, peelable labels and peelable stamps i.e. labels that can be readily peeled, removed, stripped, or detached from an underlying sheet or backing sheet.

As will be described in greater detail hereinafter, the method of the present invention further provides techniques and structures for applying high intensity UV light from UV-LED chips in an array or arrays to a UV curable product, article, ink, coating, adhesive, or other object to be cured.

According to one of the teachings of the present invention, there is provided a UV curing apparatus, system and method for curing UV curable products, articles, inks, coatings, adhesives, and other objects that have a UV curable material thereon or therein and that are placed on a moving conveyor, comprising: a UV curing station having at least one curing apparatus positioned above or at one side of the conveyor; arrays of UV LEDs for directing UV light at UV curable products, articles, inks, coatings, adhesives, and other objects on the conveyor; a heat sink system for removing heat from the UV LEDs; one or more sensors for sensing when UV curable products, articles, inks, coatings, adhesives, and other objects are adjacent at least one of the curing apparatus; and a controller for energizing and controlling the arrays of UV LEDs for a predetermined curing time as well as for operating the heat sink system.

A more detailed explanation of the invention is provided in the following description and appended claims taken in conjunction with the accompanying drawings.

DETAILED DESCRIPTION OF THE INVENTION

A detailed description of the preferred embodiments and best modes for practicing the invention are described herein.

Figure 1:
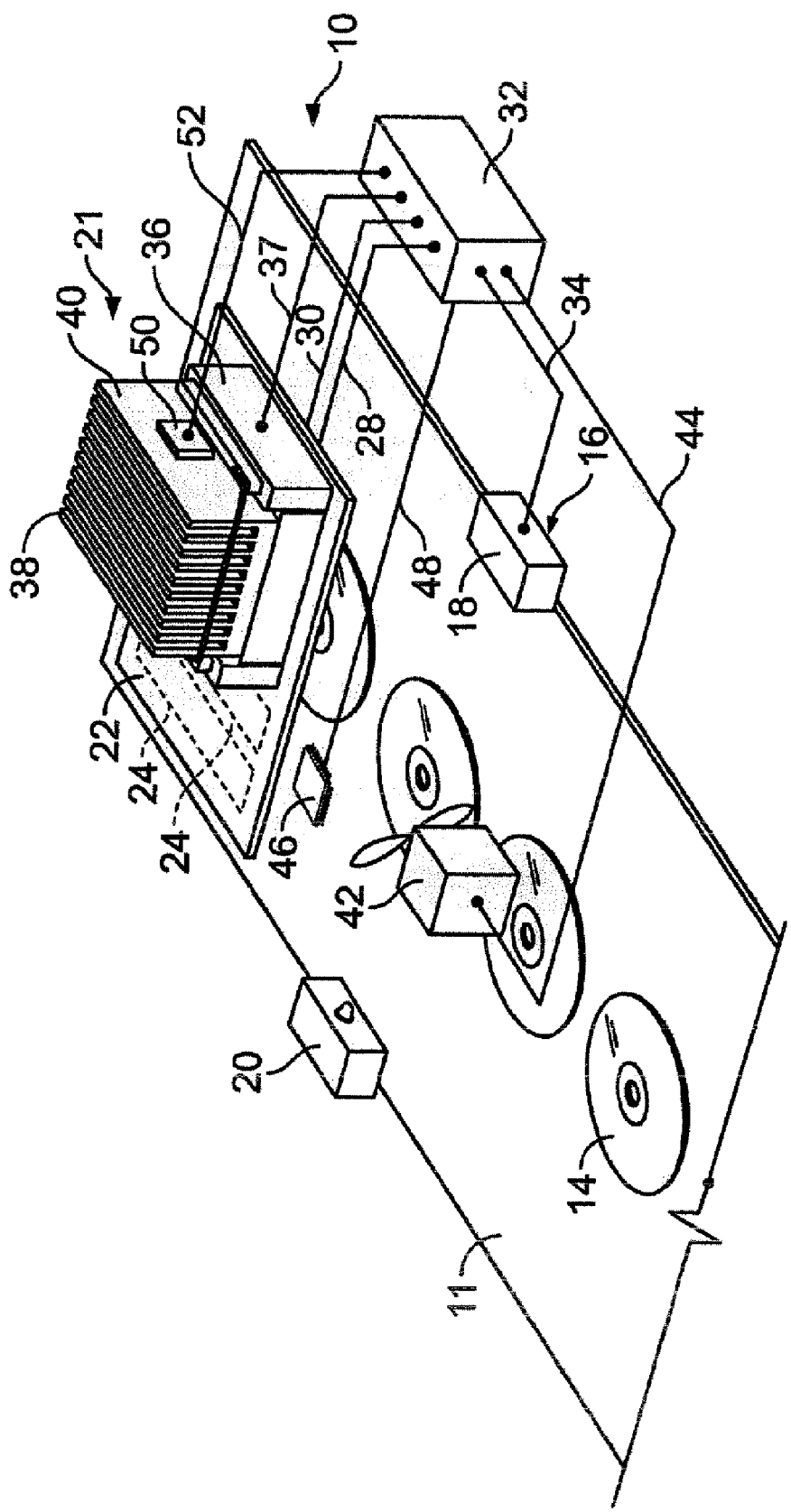
FIG. 1 is a perspective view of a curing apparatus which employs a heat pump for cooling one or more arrays of UV LEDs which direct UV light onto UV curable products, articles, inks, coatings, adhesives, and other objects to be cured on a conveyor and which are electrically driven beyond their normal rating and a feedback loop including a controller for shutting off the UV LEDs when their temperature reaches a predetermined level and/or the intensity of the UV light emitted from the UV LEDs diminishes below a predetermined level.

Referring now to the drawings in greater detail, there is illustrated in FIG. 1 an ultraviolet (UV) light-emitting diode (LED) curing station 10 which is positioned adjacent and above a conveyor 11.

The conveyor 11 can carry a series, set, array, or a plurality of UV curable products, articles or other objects, in this instance, compact disks (discs) (CDs) 12, each of which has a top surface or side 14 which has been coated and/or a printed with a UV curable coating and/or UV curable ink.

At or in proximity to the UV curing station 10 is positioned a product sensing system 16. The product sensing system can include an optical sensing system with an electric eye sensor 18 which detects and senses a light beam from a light emitter 20 for sensing when a CD 12 or other UV curable product, article, or object is present at the UV curing station 10 and in the normal area of a UV light path.

The sensing system 16 can take other forms, such as, for example a motion detector system. Furthermore, when the UV curable coated or printed product includes a magnetizable metal, a magnetic detector system can be used. The sensing system can also include one or more pressure sensors or weight detectors.

The UV curing station includes a UV curing apparatus 21 comprising a heat conducting substrate 22 (FIGS. 1 and 2) having mounted on the underside thereof, UV light emitters 20 comprising several staggered arrays 24 of UV light-emitting diodes (LEDs) such as UV LED chips 26 (FIG. 2) that are electronically coupled via wire conductors 28 and 30 (FIG. 1) to a controller 32. The UV LEDs can also comprise organic LEDs (OLED) and/or polymer LEDs (PLED). The sensing system 16 is also coupled to the controller 32 by wire conductor(s) 34. When the sensing system 16 signals the controller 32 that a printed or coated CD 12 or other UV curable product, article, or object is present beneath the substrate 22 having the plurality of arrays 24 of UV LED chips 26 (FIG. 2) on the underside thereof, the controller 32, causes the UV LED chips 26 (FIG. 2) to be electrically energized and driven electrically in excess of their normal rating, preferably in an amount ranging from 2 to 4 times above the rated current for the UV LED chips 26 (FIG. 2) via the electric wire conductors 28 and 30. UV light at high intensity is then emitted and directed toward the CD 12, or other UV curable product, article or object in the UV light path, at the curing station 10.

It is to be preferred that the substrate 22 (FIG. 1), having the arrays 24 of UV LED chips 26 on the underside thereof, is positioned as close as possible to the CD 12 or other UV curable product, article, or object since light intensity decreases exponentially as the distance that the UV light beam has to travel from the point of emission of the UV LED chips to the object to be cured increases, but no closer than a viewing cone angle, $2\theta_{1/2}$ where the cone of light that emanates from an UV-LED chip is at least 50% of the light power output of the chip. The effectiveness of the UV emitted light dissipates exponentially as the distance to the product, article or other UV curable object to be treated increases.

When the UV LED chips 26 (FIG. 2) are driven beyond their normal rating range, they will heat up quickly. As a result, the intensity of the UV LED light emitted from the UV LED chip decreases dramatically. To enable the UV LED chips 26 to be driven beyond their normal rating, a cooling device such as a heat pump 36 (FIG. 1) is mounted on the substrate 22 to help dissipate and draw off the heat generated in the UV LED chips 26 by driving them beyond their normal operating range. The heat pump 36 is coupled to the controller 32 by wire conductor(s) 37 but is typically maintained ON all the time during UV curing at the UV curing station 10. In one embodiment, the arrays 24 of UV LED chips 26 are fixed to the thermally conductive substrate 22 by a conductive adhesive to better conduct the heat from the UV LED chips 26 to the thermally conductive substrate 22 and from there by the colder side of the heat pump 36. The heat pump 36 can be a Melcor Thermoelectric heat pump sold by MELCOR CORPORATION of Trenton, N.J.

Initially the colder side of the heat pump 36 (FIG. 1) will cool the thermally conductive substrate 22 mounting the UV LED chips. However, in view of the large amount of heat generated by the UV LED chips being driven beyond their normal operating range, the normal capacity of the heat pump can be exceeded. Accordingly, to further the dissipation of heat, the hotter side of the heat pump 36 has a heat sink 38 mounted thereon. The heat sink 38 typically has a plurality, set or array of heat radiating fins 40 that extend outwardly from the heat pump 36 for radiating heat into the ambient air and dissipate the heat by convection. To further assist in the dissipation of heat from the fins 40, a motor operable fan 42 can be coupled by wire conductor(s) 44 to the controller 32. The operation of the fan 42 can be controlled by the controller 32 coupled by wire conductor(s) 44 to the fan 42. Typically the fan 42 is maintained ON all the time UV curing occurs at the UV curing station 10.

To control operation of the UV LED chips, a light intensity sensor 46 (FIG. 1) can be positioned beneath the arrays 24 of UV LED chips 26 and is coupled by wire conductor(s) 48 to the controller 32. Further sensing and control can be obtained with a heat (temperature) sensor 50 on the heat sink 38 which is coupled by wire conductor(s) 52 to the controller 32.

Desirably, the UV LED chips 26 coupled to the controller 32 (FIG. 1), along with the light sensor 46 and the heat (temperature) sensor 50, comprise a control loop.

Figure 2:
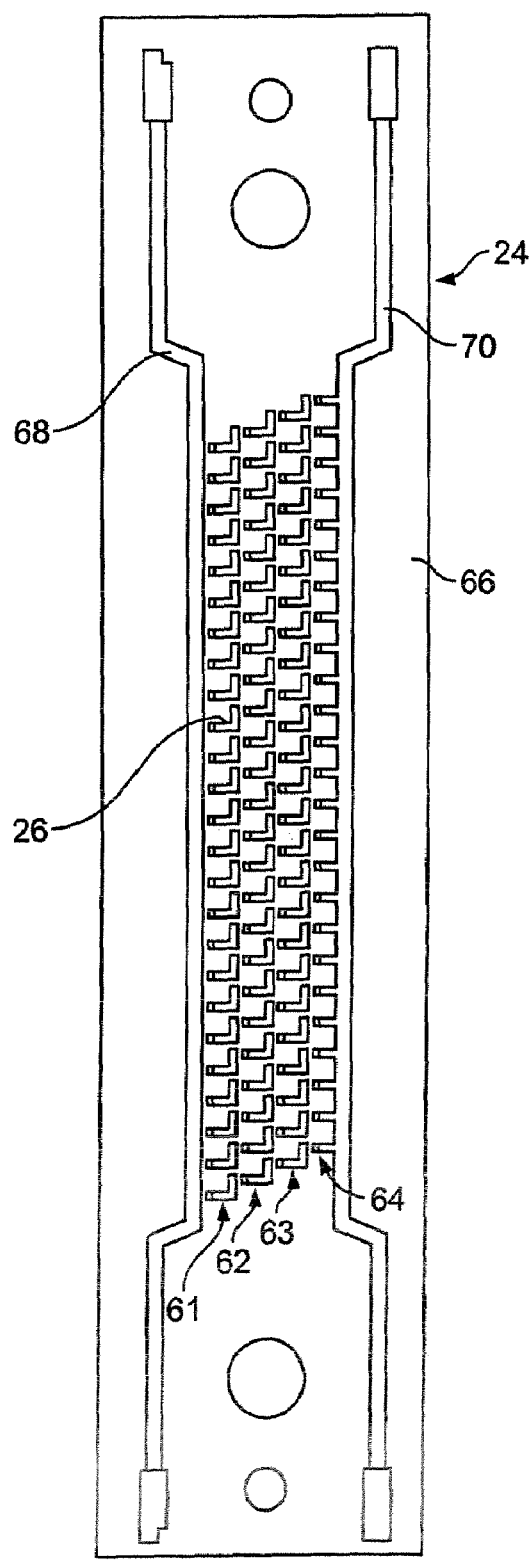
FIG. 2 is a plan view of one die array of four rows of UV LED chips.

As shown in FIG. 2, one panel array 24 of four rows 61, 62, 63 and 64 of UV LED chips 26 can be arranged on a die panel 66. The die panel 66 can be about four inches long and can have two bus strips 68 and 70 thereon connected to the UV LED chips 26.

The UV LED chips 26 in one row 61 can be staggered from the UV LED chips 26 in the other rows 62, 63 and 64 so that overlapping light beams are emitted from each UV LED chip 26 in the staggered array of rows 61-64 of UV LED chips 26. In this way, a more complete and uniform distribution, illumination and emission of UV light on the printing and/or coating on the CD 14 or other UV curable product, article or object is assured.

In the operation of the control loop, once the product sensing system 16 (FIG. 1) senses a UV curable product, article, or other object, such as a CD 12, underneath the array 24 of the UV LED chips 26 on the underside of the substrate 22, the controller 32 activates, energizes and turns on the UV LED chips 26 and drives them in an amount ranging from 2 to 4 times their normal operating range, typically 3 times their normal operating range.

Empirically, it was found that when the UV LED chips are driven beyond their normal range, such as 3 times their normal operation range, they emit light at an intensity up to 8 times greater than the light intensity emitted by the UV LED chips when they are driven at their normal current rating of approximately 1.2 amps.

The decrease in light intensity can be sensed by the light sensor 46 (FIG. 1). The increase in temperature of the heat sink 38 can be sensed by the heat (temperature) sensor 50. When a decrease in light intensity below a certain value and/or an increase in temperature above another value is sensed, the controller 32 reduces, decreases or shuts off the supply of electric current via the conductors 28, 30 to the UV LED chips 26 on the underside of the substrate 22. The controller 32 cooperates with heat (temperature) sensor 50 to measure and integrate UV light from the LEDs within the dwell cycle and increase or otherwise vary the current to assure a uniform constant level and output of UV light on the UV curable products, articles, inks, coatings, adhesives, or other objects on the conveyor 11.

Concurrently, the heat pump 36 is working to dissipate and draw away heat from the substrate 22 (FIG. 1) and thereby cool the UV LED chips 26. Typically, the substrate 22 is cooled down sufficiently in about two seconds by the combined operation of the heat pump 36, the radiation and dissipation of heat from the heat fins 40 of the heat sink 38, and by the cooling air propelled by the fan 42 circulating across the heat fins.

The decreased energization time (de-energizing time) or off time can be synchronized with the movement of the conveyor 11 (FIG. 1) which takes about 2 seconds to move a subsequent CD or other UV curable product, article or other object, to a position in front of the electric eye sensor 18 and beneath the substrate 22 at the curing station 10. The preceding cycle and procedure are repeated for the subsequent CDs 12.

The UV curing apparatus 21 (FIG. 1) emits a uniform distribution of UV light at a higher light output and intermittent high intensity pulses or bursts of UV light and power in a UV light path on the UV curable products, coatings, adhesives, inks, articles or other objects on the conveyor to uniformly partially or fully rapidly and effectively polymerize, set and cure the UV curable products, coatings, adhesives, inks, articles or other objects passing in the path of the UV light on the conveyor in an incremental, sequential or continuous manner.

Empirical tests have shown that operating the UV LED chips 26 three (3) times above their normal operating range does not appear to adversely affect or degrade their operating life while emitting as much as 8 times the light output and power of a conventional UV lamp and achieves a much shorter curing time with the control loop and controller of the present invention.

If desired, an oscillating, reciprocating, orbiting or other moving mechanism for moving the substrate, as illustrated and described in applicant's earlier applications referred to in the Cross Reference to Related Applications which are hereby incorporated by reference, can be provided for moving the substrate 22 in a preselected path to further ensure an even and more uniform application of UV curing light to the UV curable product, article or other object, e.g., the CD 12.

Figure 3:
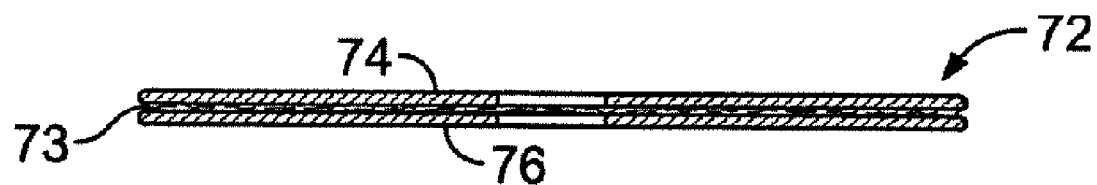
FIG. 3 is a cross-sectional view of a DVD which can be the object on the conveyor shown in FIG. 1.

In FIG. 3 there is shown a cross-section of a prior art digital video disk (disc) (DVD) 72. Such DVDs 72 can be placed on the conveyor 11 and cured in a manner similar to the curing of the CD 12 with applicant's UV curing apparatus. The UV curable material being cured on the DVD can be UV curable adhesive 73 between the upper and lower layers 74, 76 of the DVD 72. Additionally, UV curable printing (ink) providing a label on the DVD in black or one or more colors and/or a clear transparent scratch-resistant UV curable coating on the outside (exterior) of the DVD can be polymerized and cured by UV LED light emitted from the UV curing apparatus. The DVDs 72 can be uniformly partially or fully polymerized, set, and cured while they are rotating, spinning or stopped (stationary) on or off the conveyor 11.

Figure 4:
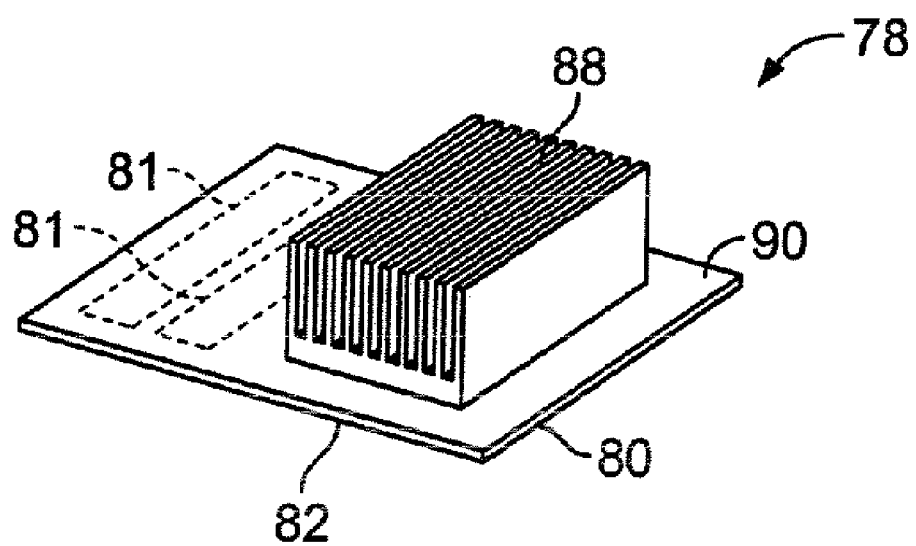
FIG. 4 is an alternate embodiment of a curing apparatus which includes a substrate mounting several arrays of UV LEDs where the substrate can be cooled only by a heat sink and which can be used in place of the curing apparatus shown in FIG. 1 that includes a heat ink and a heat pump.

In FIG. 4 there is shown a simpler UV curing apparatus 78 which comprises a substrate 80 having a plurality of arrays 81 of UV LEDs on the underside 82 thereof, two of which are shown in FIG. 4. Also a heat sink 88 is mounted on the upper or outer side 90 of the substrate 80. In this embodiment a heat pump need not be used. However a fan (not shown), similar to fan 42 in FIG. 1, is typically used to assist in the cooling of the heat sink 88.

Also, it is understood that UV light can be directed in one or more UV light paths onto the UV curable products, articles, inks, coatings, adhesives and other objects, from not only above the conveyor but also from one or both sides of the conveyor 11 (FIG. 1) and two or three of the curing apparatus 78 (FIG. 4) or 21 (FIG. 1) can be used and positioned adjacent the conveyor 11.

Figure 5:
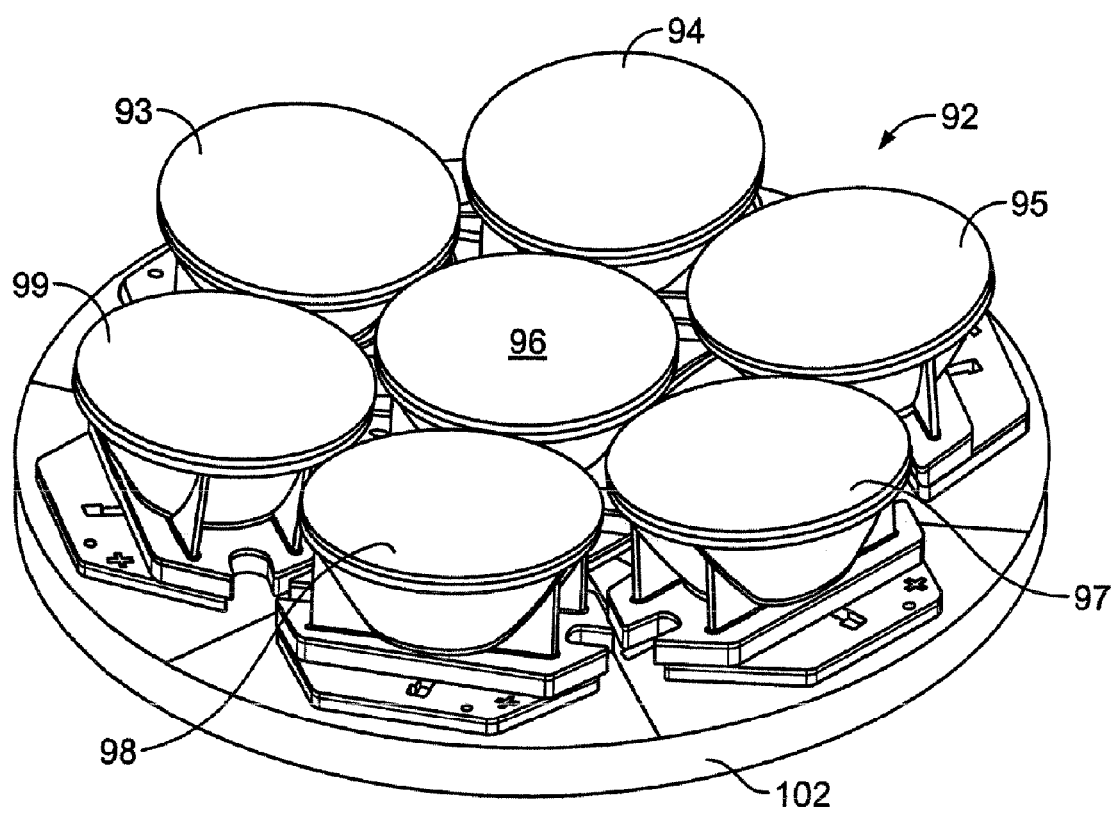
FIG. 5 is a perspective view of another curing apparatus which can be used to cure the UV curable products, articles, inks, coatings, adhesives, and other objects shown in FIG. 1 and the UV curable products, articles, inks, coatings, adhesives, and other objects shown in the other figures and which includes seven bowl shaped reflectors each having forty UV LEDs mounted in the center and where the six outer bowl shaped reflectors having an axis which is slightly tilted so that all seven bowl shape reflectors direct and reinforce UV light directed to a curing area on the conveyor.
Figure 6:
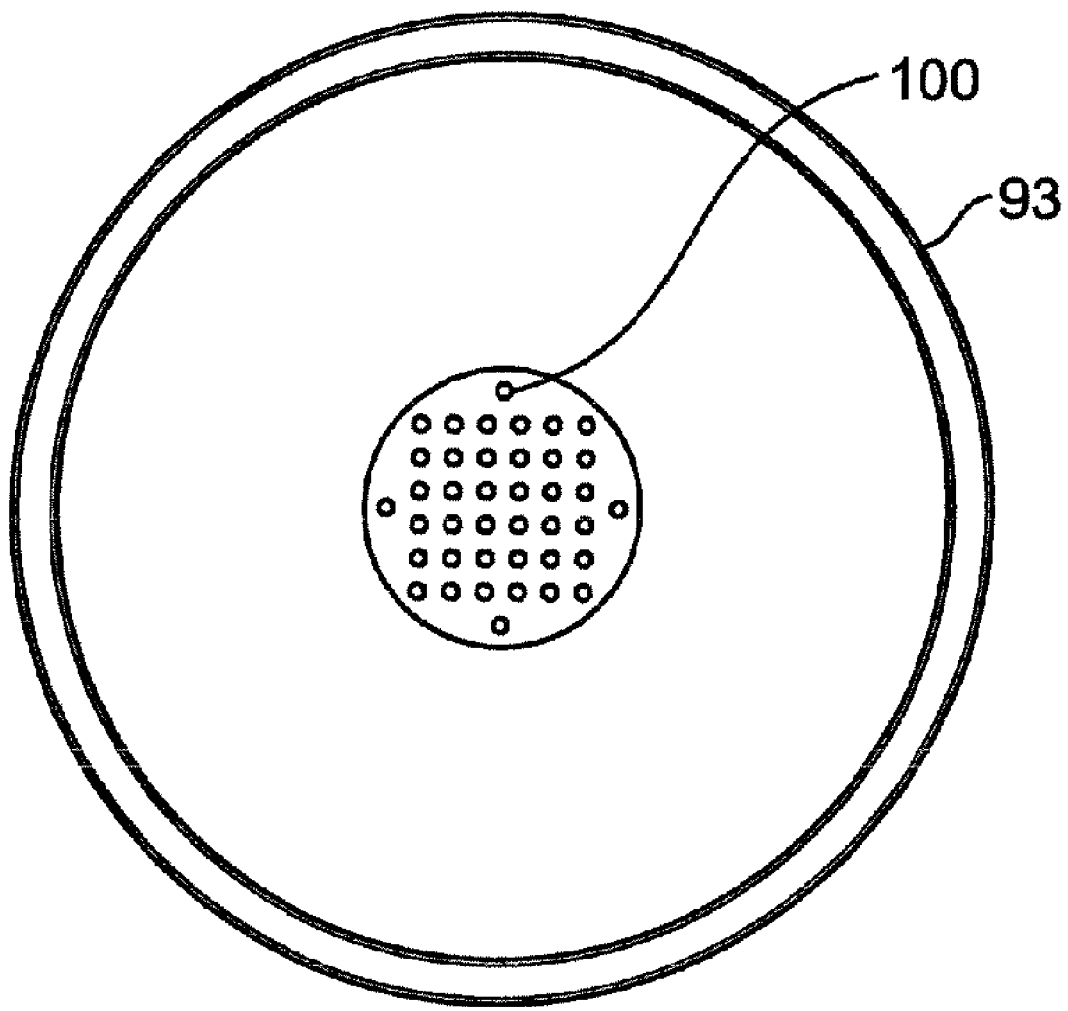
FIG. 6 is a top plan view of one of the bowl shaped reflectors.

In FIG. 5 there is shown another type of UV curing apparatus 92 which includes an array of seven concave bowl-shaped UV reflectors 93-99 each having a multitude of 40 UV LEDs 100 (FIG. 6) mounted in the center (central) portion thereof as best shown in FIG. 6. In this UV curing apparatus 92, which can be of the type sold by NORLUX Corporation of Carol Stream, Ill. as a 7 HEX CLUSTER, the center UV reflector 96 has a central axis which is normal or perpendicular to a mounting platform 102 mounting the reflectors 93-99. The six outer surrounding concave bowl-shaped UV reflectors 93-95 and 97-99 are arranged on tilted axes each of which is angled toward the center axis of the center UV reflector 96 so that the axis of each of the bowl shaped reflectors 93-99 converge to a focal point at a UV curing area in the UV light path(s) on or above the conveyor. In this way, reinforced UV light from UV LEDs 100 of the UV curing apparatus 92 are focused or concentrated on or at a UV curing area to uniformly partially or fully cure, polymerize and set the UV curable coating or ink in the UV light path of the UV curing apparatus 92. Although not shown, it is to be understood that a heat sink or heat pump as previously described can be attached to the mounting platform 102 for conducting heat away from the curing apparatus 92.

Figure 7:
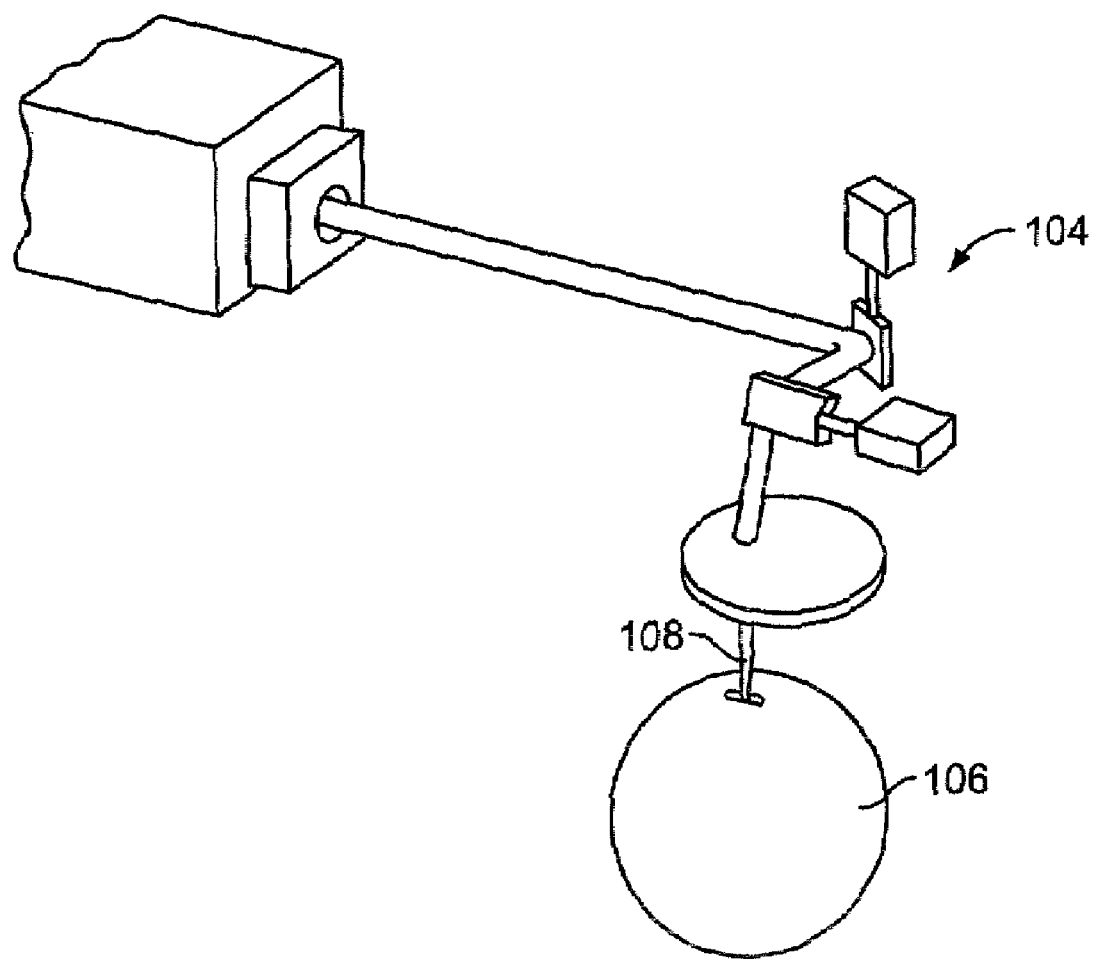
FIG. 7 is a perspective view of a prior art apparatus for writing indicia on a golf ball with a UV curable ink.

FIG. 7 shows a prior art apparatus 104 for printing indicia on a golf ball 106 with a stylet 108.

Figure 8:
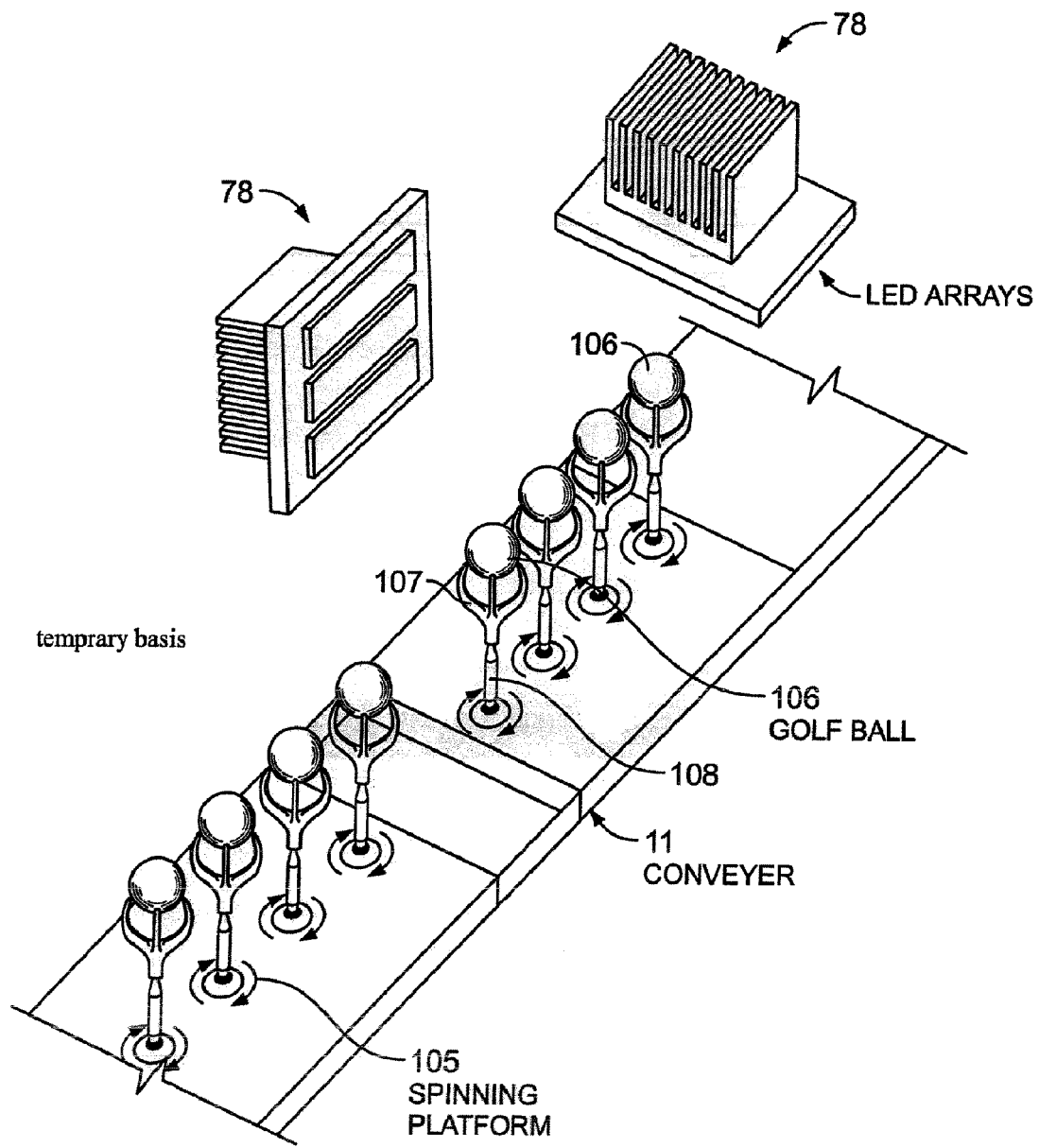
FIG. 8 is a perspective view of two of the curing apparatus shown in FIG. 4 positioned above and adjacent a conveyor carrying golf balls which are also rotating on the conveyor and which have a UV curable coating thereon.

FIG. 8 shows the UV curing apparatus 78 of FIG. 4 mounted above a conveyor 11 carrying golf balls 106 which can be rotated by a spinning platform 105 on the conveyor 11. The spinning platform can have arcuate fingers 107 that extend upwardly from a rotatable (rotating) shaft 108. In this embodiment, a second UV curing apparatus 78 of the type shown in FIG. 4 is positioned adjacent the conveyor 11 and perpendicular to the first UV curing apparatus so that UV light can be emitted and directed from two directions one or more UV light paths to uniformly distribute UV light onto the gold balls 106 to more uniformly and evenly cure the UV curable printing (ink), coating or adhesive on the golf balls 106. The golf balls 106 can be uniformly, partially, or fully polymerized, set and cured when rotating, spinning or when stopped (stationary) on or off the conveyor 11. The golf balls can be coated and protected with a clear transparent scratch-resistant UV curable coating and/or can be printed or labeled with a name and/or logo and/or design in a UV curable ink, either black ink or one or more colored inks.

Figure 9:
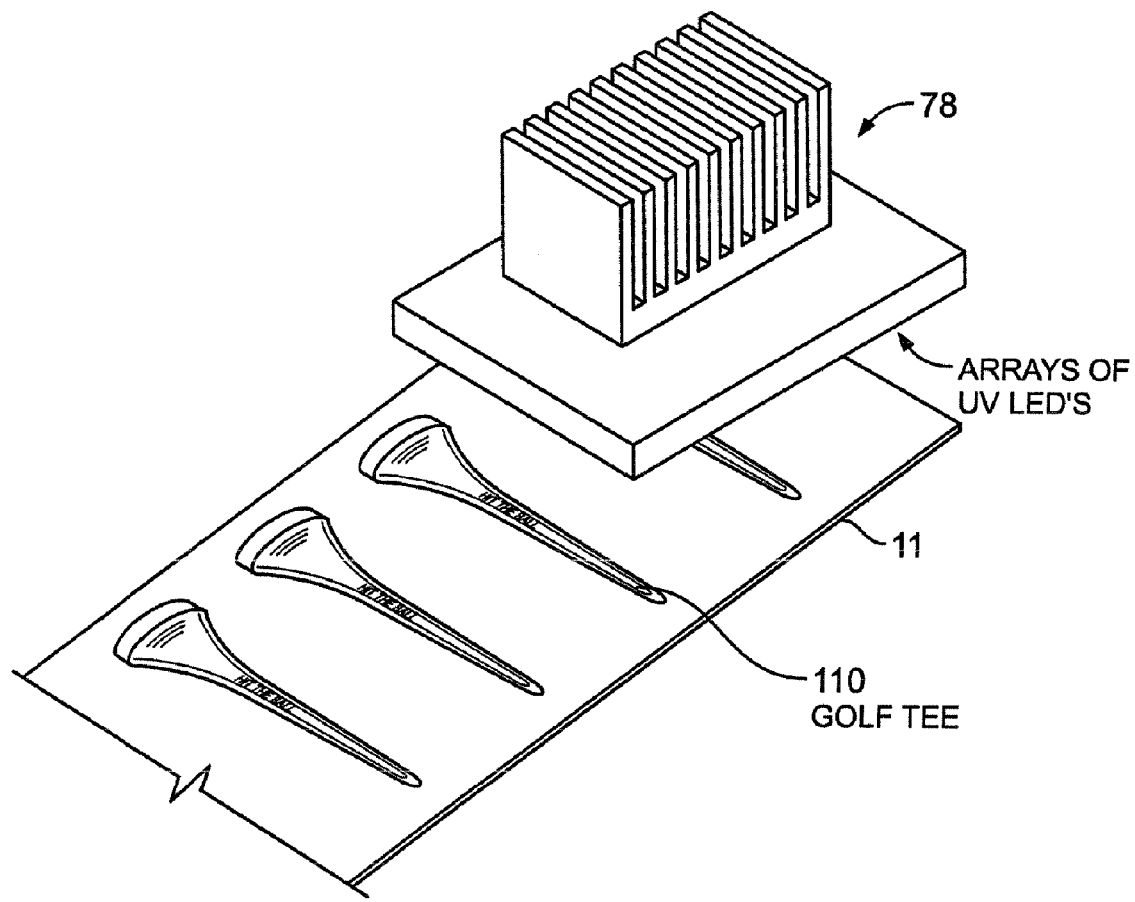
FIG. 9 is a perspective view of a curing apparatus of the type shown in FIG. 4 positioned over a portion of a conveyor carrying golf tees which have been coated and/or printed with a UV curable material.

In FIG. 9 there is illustrated a UV curing apparatus 78 of the type shown in FIG. 4 positioned above a conveyor 11 carrying golf tees 110. In this embodiment, a UV curable coating or ink on the golf tees 110 can be uniformly partially or fully polymerized, set and cured as the conveyor 11 passes in a UV light path underneath the curing apparatus 78. If desired, another UV curing apparatus 78 (or 21) also can be positioned on each side of the conveyor 11 for emitting, directing and applying UV light onto the golf tees 110 in another UV light path(s) from different directions.

Figure 10:
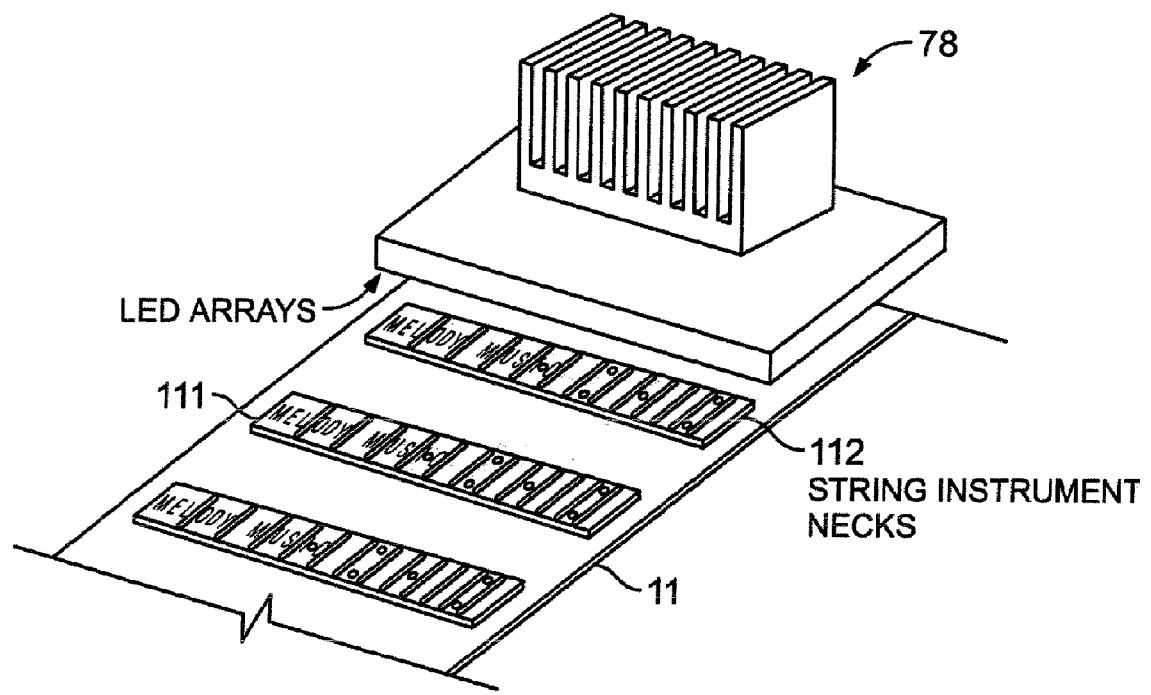
FIG. 10 is a perspective view similar to the view shown in FIG. 9 illustrating a curing apparatus as shown in FIG. 4 positioned over a portion of a conveyor containing string instrument necks which have a UV curable coating thereon.

In FIG. 10 there is shown another embodiment of the present invention wherein a UV curing apparatus 78 of the type shown in FIG. 4, is positioned over the conveyor 11 carrying string instruments 111 with necks 112 or other portions having UV curable coating, adhesive, or printing material thereon. The string instruments can be coated with a decorative UV curable coating or a clean transparent scratch-resistant UV curable coating. Various string instruments can be cured in this manner, such as: violins, violas, cellos, base violins, double base violins, guitars, mandolins, balalaikas, ukuleles, harps, etc. The UV curing apparatus 78 emits bursts or blasts of UV light in a light path to uniformly partially or fully polymerize, set and cure the UV curable coating on the string instruments.

Figure 11:
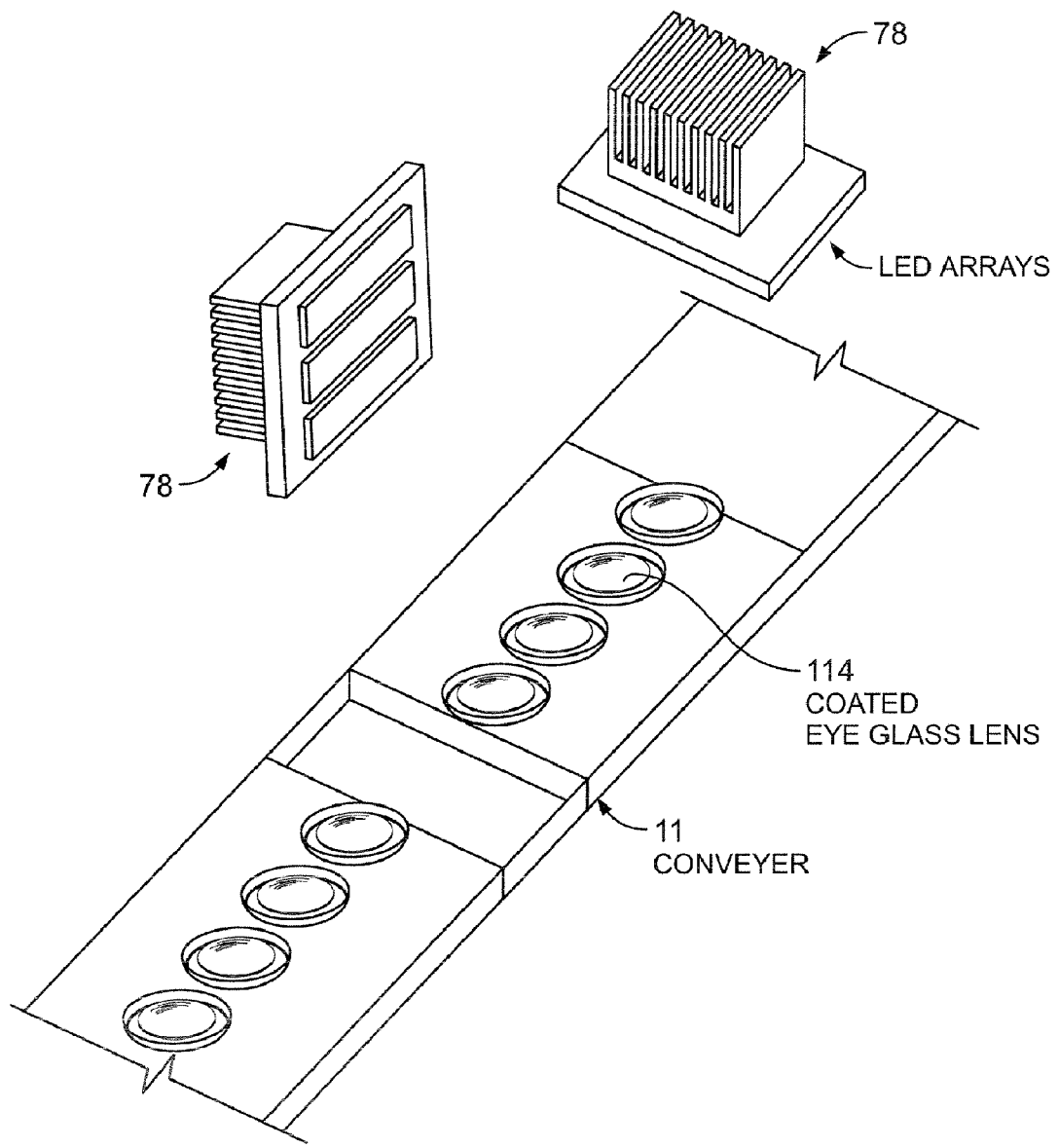
FIG. 11 is a perspective view showing two curing apparatus of the type shown in FIG. 4 positioned above and adjacent a conveyor carrying coated eye glass lens.

FIG. 11 shows two of the UV curing apparatus 78 of the type shown in FIG. 4 positioned adjacent and above a conveyor 11 carrying eye glass lenses 114 which have been coated with a scratch-resistant UV curable coating. The UV carrying apparatus can be positioned perpendicular or at other angles to each other to more uniformly distribute UV light is one or more UV light paths on the UV curable coating on the lens to enhance uniform curing and polymerization of the coating on the lens. The eye glass lenses 114 can be coated with a UV curable coating comprising a color tint (amber, grey, etc.) and/or clear transparent protective scratch-resistant coating and/or a UV-blocking coating. The eye glass lenses can be uniformly partially or fully polymerized, set and cured while rotating or stopped (stationary) on or off the conveyor 11.

Figure 12:
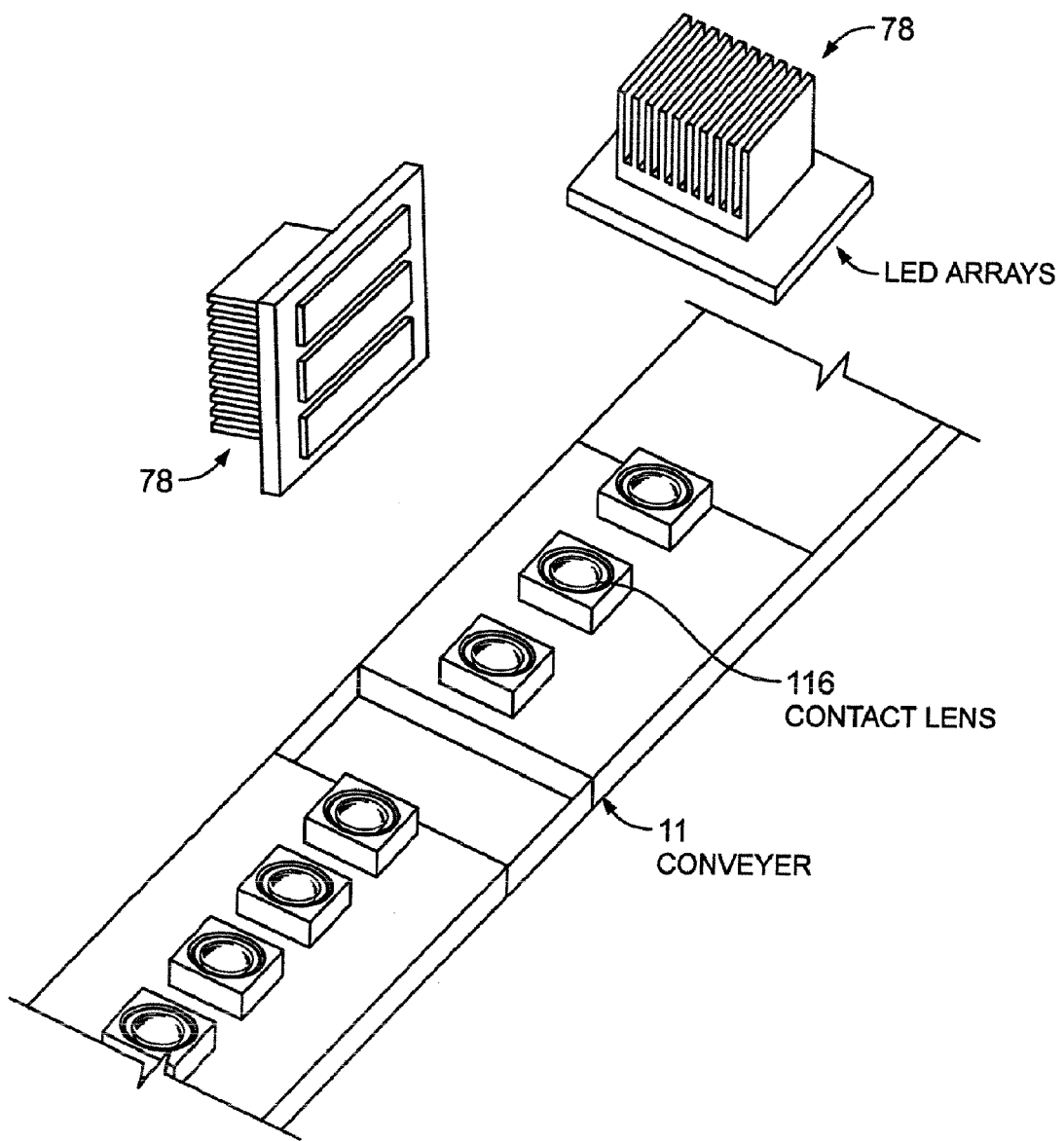
FIG. 12 is a perspective view of two curing apparatus of the type shown in FIG. 4 positioned above and adjacent a conveyor carrying contact lens which are made of or have a coating made of a UV curable material.

FIG. 12 shows two of the UV curing devices 78 of the type shown in FIG. 4 positioned above and adjacent a conveyor carrying UV curable soft hydroscopic contact lenses 116 containing a UV curable material or coating. The UV curing apparatus can be positioned perpendicular to each other to more uniformly distribute UV light on the contact lenses to enhance uniform curing and polymerization of the UV curable material or coating on the contact lenses. It will be appreciated that, for the sake of illustration, only a single line of contact lenses 114 is shown for illustrating the UV curing method and apparatus of the present invention. However, in practice, a plurality of lines of contact lenses 116 are carried on the conveyor 11. The contact lenses 116 can be coated with a UV curable coating comprising a UV curable color tint and/or can be coated with a clear transparent protective scratch-resistant UV curable coating. The contact lenses 116 can be cured while spinning, rotating or stopped (stationary) on or off the conveyor 11.

Figure 13:
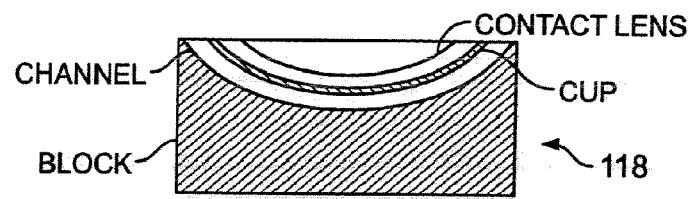
FIG. 13 is a cross-section of one form of carrier for the contact lens carried on the conveyor as shown in FIG. 12.

FIG. 13 is a sectional view of one type of contact lens holder 118 or suction cup which can be used on the conveyor 11 for holding and carrying the contact lenses 116.

Figure 14:
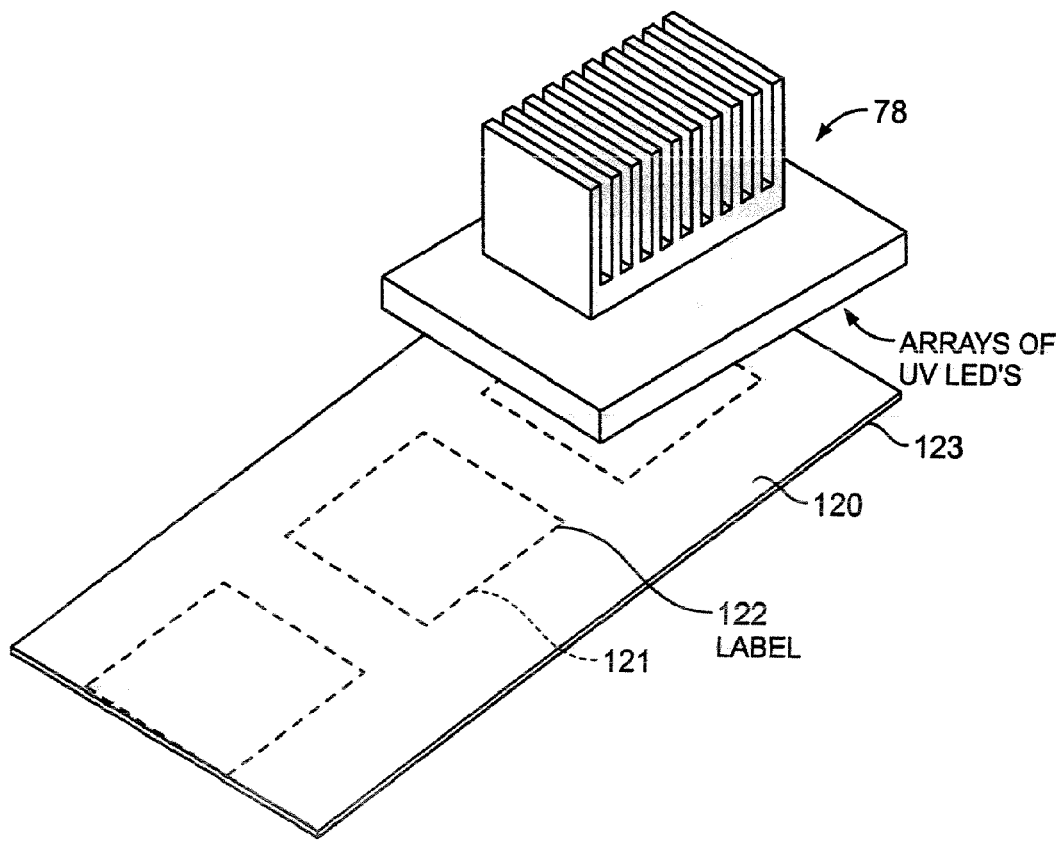
FIG. 14 is a perspective view of a curing apparatus of the type shown in FIG. 4 positioned over a conveyor carrying labels which have a UV adhesive and a backing material beneath the label.

In the embodiment of FIG. 14, a sheet 120 or roll of peelable labels or peelable stamps 122 is positioned on a conveyor (not shown) below a UV curing apparatus 78 of the type shown in FIG. 4. The sheet of peelable (removable, strippable or detachable) labels or stamps includes a silicon release liner 121 or other UV curable releasable adhesive sandwiched between an upper layer of labels 122 or stamps, and a lower backing layer 123. The peelable labels or peelable stamps can be readily peeled, removed, stripped or detached from the release liner 121 on the sheets 120.

Figure 15:
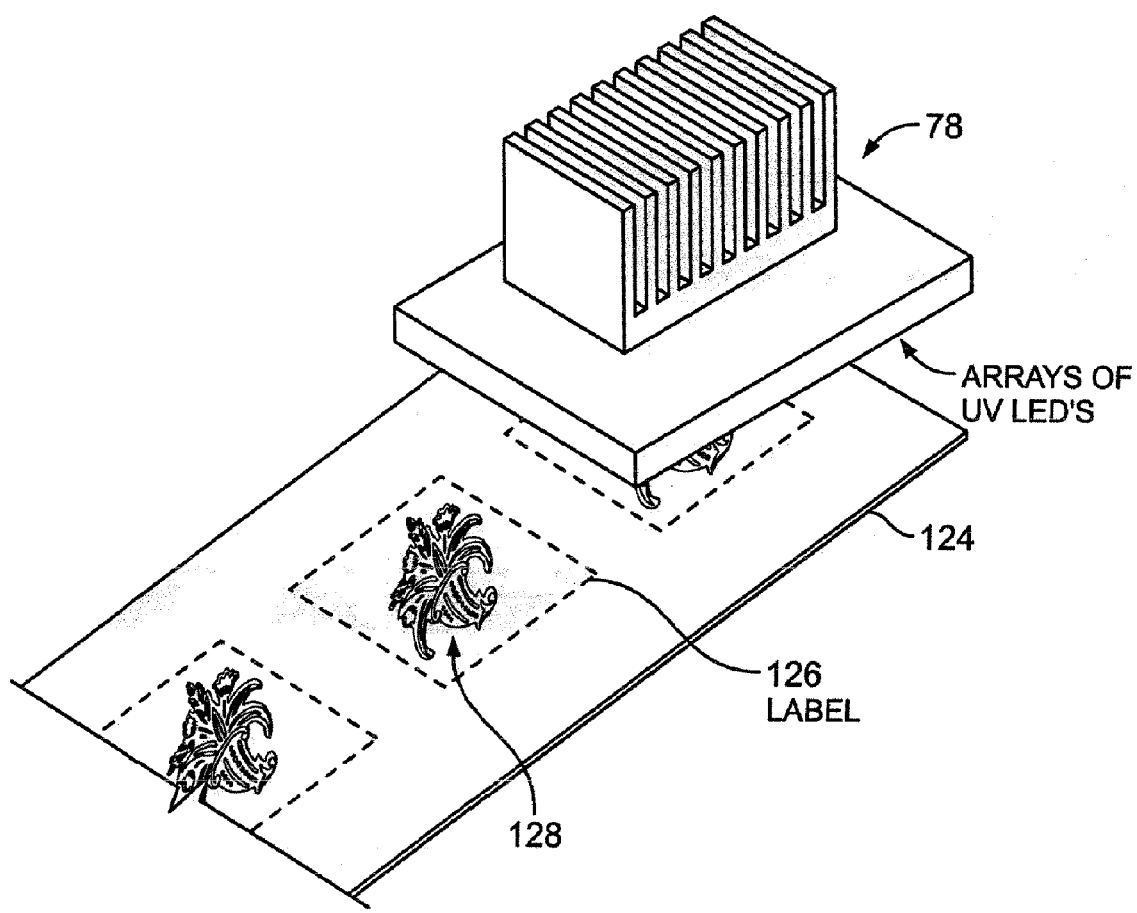
FIG. 15 is a view similar to the view shown in FIG. 14 and shows a UV curing apparatus of the type shown in FIG. 4 positioned over a conveyor carrying labels for curing UV curable print (ink) on the label.

The embodiment of FIG. 15 is similar to the embodiment shown in FIG. 14 but with decorative peelable labels 124 or peelable stamps on a sheet 126 or roll. The peelable labels or stamps have UV curable print (ink) 128 (black or one or more colors) on the front or upper surface thereof which is cured by one or more UV curing apparatus 78.

The UV curable apparatus 78 emits intermittent pulses or blasts of UV light along a UV light path to uniformly fully or partially polymerize, set, and cure the UV curable ink or UV curable adhesive on the peelable stamps 122 (FIG. 14) or peelable labels 124 (FIG. 15).

Figure 16:
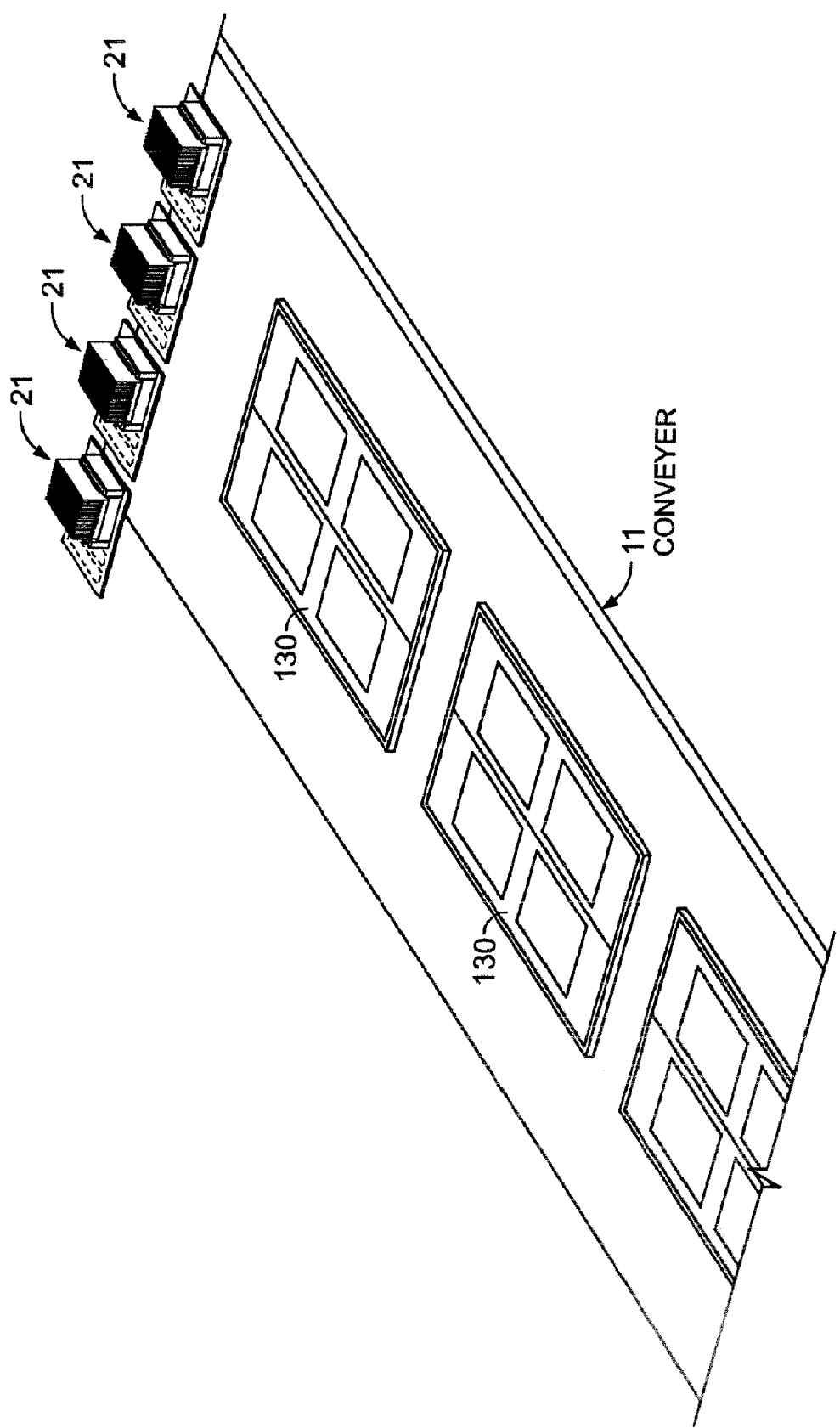
FIG. 16 is a perspective view of the UV curing apparatus of FIG. 4 positioned along a portion of a conveyor carrying doors which have been coated with a UV curable coating.

In the embodiment of FIG. 16, wooden, metal or composite doors 130 are positioned horizontally upon or hung vertically from a conveyor 11. The doors are coated with a UV curable coating such as a clear transparent scratch-resistant UV curable coating or a colored UV curable coating providing a UV curable paint or UV curable stain. One or more UV curing apparatus 21 are positioned to emit and uniformly distribute and apply UV light along one or more UV light paths to each surface of the doors 130 to uniformly fully or partially cure, set and polymerize the UV curable coating on the doors 130.

Figure 17:
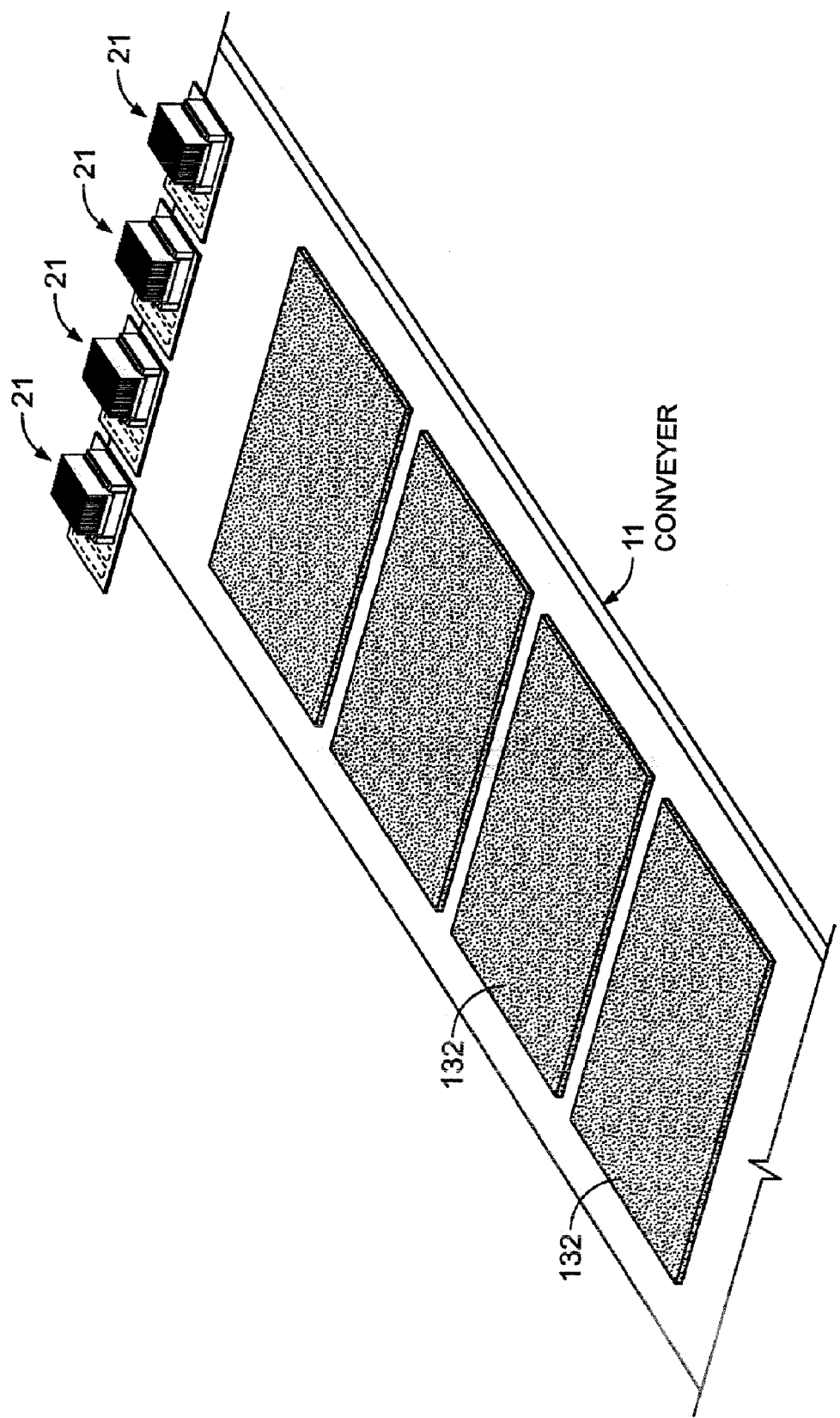
FIG. 17 is a perspective view of the UV curing apparatus of FIG. 4 positioned over a portion of a conveyor carrying countertops which have been coated with a UV curable coating.

In the embodiment of FIG. 17, wooden, metal, stone, or composite counter tops 132 are positioned on a conveyor with their top surfaces facing upwardly and below one or more UV curing apparatus 21. The top surfaces of the counter tops 132 are coated with a UV curable coating such as a clear transparent scratch-resistant UV curable coating or a colored UV curable coating. The UV curing apparatus 21 emits intermittent pulses or blasts of UV light along one or more UV light paths to uniformly fully or partially cure, set, and polymerize the UV curable coating on the counter tops 132.

Other products with a UV curable coating, ink or adhesive thereon can cured on a conveyor by using one or more UV curing apparatus 78 in a manner generally similar to that described above.

In all the embodiments shown in the drawings and/or described in the specification, it is be understood that one, two, or three or more UV curing apparatus 21 or 78 can be positioned over and on either or both sides of the path of travel of the UV curable products, articles, inks, coatings, adhesives, or other objects in a manner to uniformly distribute the UV light along one or more UV light paths on the UV curable products, articles, inks, coatings, adhesives, or other objects to increase uniform curing and polymerization of the UV curable products, articles, inks, coatings, adhesives, or other objects.

Although embodiments of the invention have been shown and described, it will be understood that various modifications and substitutions, as well as rearrangements of components, parts, equipment, apparatus, process (method) steps, and uses thereof, can be made by those skilled in the art without departing from the teachings of the invention. Accordingly, the scope of the invention is only to be limited as necessitated by the accompanying claims.

What is claimed is:

1. A method for curing ultraviolet (UV) curable products, articles, inks, coatings, adhesives or other objects, comprising the steps of:
    driving at least one UV LED with intermittent pulses of electrical current in excess of a normal input current range to produce a high intensity UV light emitted from the at least one UV LED, wherein the at least one UV LED is mounted on a first side of a thermally conductive substrate;
    mounting a heat sink on a second side of the substrate;
    sensing an intensity of the high intensity UV light emitted from the at least one UV LED while sensing a temperature of the heat sink;
    optimizing the intensity of the high intensity UV light emitted from the at least one UV LED by automatically adjusting the electrical current in response to the intensity that is sensed and the temperature that is sensed to obtain and maintain a substantially constant high intensity UV light;
    positioning the UV curable products, articles, inks, coatings, adhesives, or other objects in curable proximity to the at least one UV LED; and
    substantially uniformly polymerizing, setting and curing the UV curable products, articles, inks, coatings, adhesives or other objects using the substantially constant high intensity UV light.

2. The method of claim 1 wherein the substantially constant high intensity UV light is emitted from UV light emitting diodes (LEDs) selected from the group consisting of UV light-emitting diode (LED) chips, organic LEDs, and polymer LEDs.

3. The method of claim 1 wherein the substantially constant high intensity UV light is emitted from staggered arrays of UV light-emitting diodes (LEDs).

4. The method of claim 1 wherein the substantially constant high intensity UV light is emitted from one or more UV light emitters in an UV curing apparatus.

5. The method of claim 4 including cooling the UV curing apparatus with at least one cooling device selected from the group consisting of a heat sink, fin, heat pump, and a fan.

6. The method of claim 1 wherein at least one of at least one golf ball, at least one compact disc, at least one DVD, at least one golf tee, at least one eye glass lens, at least one contact lens, at least one string instrument, at least one decorative label, at least one peelable label, at least one door, and at least one countertop is conveyed by a conveyor past at least one UV light path formed by the at least one UV LED.

7. The method of claim 1 including spinning or rotating at least one golf ball upon which the UV curable inks, coatings, or adhesives are placed past at least one UV light path formed by the at least one UV LED to uniformly distribute UV light from the at least one UV LED onto the at least one golf ball.

8. The method of claim 1 including stopping or maintaining the UV curable products, articles, inks, coatings, adhesives, or other objects in a stationary fixed position past at least one UV light path formed by the at least one UV LED.

9. The method of claim 1 wherein:
    the substantially constant increased UV light intensity is emitted from an array of concave UV reflectors including a center reflector and outer reflectors; and the substantially constant increased UV light intensity emitted from the UV reflectors is focused and concentrated in one or more UV light paths.

10. The method of claim 4 including positioning two UV curing apparatus in perpendicular relationship to each other.

11. The method of claim 4 including positioning multiple UV curing apparatus at angular relationships to each other.

12. The method of claim 1 including substantially uniformly polymerizing, setting and curing UV curable products selected from the group consisting of: compact discs (CDs) with a protective clear scratch-resistant UV curable coating and CDs having labels with printing comprising UV curable ink.

13. The method of claim 1 including substantially uniformly polymerizing, setting and curing UV curable products comprising digital video discs (DVDs) with a UV curable material thereon selected from the group consisting of a UV curable adhesive, a protective clear scratch-resistant UV curable coating, and a label with UV curable ink.

14. The method of claim 1 including substantially uniformly polymerizing, setting and curing UV curable products comprising golf balls with a UV curable material thereon selected from the group consisting of a protective clear scratch-resistant UV curable coating and UV curable printing or logo.

15. The method of claim 1 including substantially uniformly polymerizing, setting and curing UV curable products comprising golf tees with a UV curable material thereon selected from the group consisting of a scratch-resistant UV curable coating and UV curable ink.

16. The method of claim 1 including:
substantially uniformly polymerizing, setting and curing UV curable products comprising string instruments;
said string instruments selected from the group consisting of violins, violas, cellos, base violins, guitars, mandolins, balalaikas, ukuleles, and harps; and
said string instruments having a UV curable material thereon selected from the group consisting of a decorative coating and a clear scratch-resistant coating.

17. The method of claim 1 including substantially uniformly polymerizing, setting and curing UV curable products comprising eye glass lenses coated with a UV curable material selected from the group consisting of: color tint, a clear scratch-resistant coating, and a UV blocking coating.

18. The method of claim 1 including substantially uniformly polymerizing, setting and curing UV curable products comprising UV curable soft hydroscopic contact lenses coated with a UV curable material selected from the group consisting of a color tint and a clear scratch-resistant coating.

19. The method of claim 1 including substantially uniformly polymerizing, setting and curing UV curable products comprising peelable labels or peelable stamps detachably positioned on a release liner and having a UV curable material thereon selected from the group consisting of UV curable ink and UV curable adhesive.

20. The method of claim 1 including substantially uniformly polymerizing, setting and curing UV curable products comprising doors or countertops with a UV curable coating selected from the group consisting of a substantially clear scratch-resistant UV curable coating and a colored UV curable coating.

21. The method of claim 1 wherein the at least one UV LED is driven in excess of the normal input current range in an amount equal to about 2 to about 4 times the normal input current range to produce the intensity of the high intensity UV light in an amount equal to about 8 times a rated light intensity of the at least one UV LED.

22. The method of claim 1 wherein the at least one UV LED is affixed to the thermally conductive substrate using a conductive adhesive to conduct heat from the at least one UV LED to the thermally conductive substrate.

23. The method of claim 6 wherein movement of the conveyor is synchronized with a decrease in the electrical current supplied to the at least one UV LED.

24. The method of claim 7 wherein the spinning or rotating of the at least one golf ball is performed by a spinning platform having a plurality of arcuate fingers that extend upwardly from a rotatable shaft, wherein the arcuate fingers support the at least one golf ball.

\* \* \* \* \*